United States Patent [19]

Rimondi

[11] Patent Number: 4,611,647

[45] Date of Patent: Sep. 16, 1986

[54] AGRICULTURAL AND INDUSTRIAL TRACTOR TIRES

[75] Inventor: Giovanni Rimondi, Milan, Italy

[73] Assignee: Societa' Pneumatici Pirelli Societa per Azioni, Milan, Italy

[21] Appl. No.: 612,918

[22] Filed: May 23, 1984

[30] Foreign Application Priority Data

May 24, 1983 [IT] Italy ............... 21239 A/83

[51] Int. Cl.⁴ ............................ B60C 11/11
[52] U.S. Cl. ................................ 152/209 B
[58] Field of Search .......... 152/209 B, 209 D, 202 R; D12/136, 140

[56] References Cited

U.S. PATENT DOCUMENTS

| | | | |
|---|---|---|---|
| 2,241,227 | 5/1941 | Wait et al. ............ | 152/209 B |
| 4,289,183 | 9/1981 | Abe et al. ............ | 152/209 B |
| 4,481,993 | 11/1984 | Ohnishi ............... | 152/209 B |

FOREIGN PATENT DOCUMENTS 1098386  1/1961  Fed. Rep. of Germany ... 152/209 B

*Primary Examiner*—Michael Ball
*Attorney, Agent, or Firm*—Stevens, Davis, Miller & Mosher

[57] ABSTRACT

The invention relates to the lugs of tires intended to be mounted at least on the driving wheels of agricultural and industrial tractors; said lugs have the front sidewall, with respect to the running direction of the vehicle when in service, shaped according to a curvilinear profile which produces considerable advantages as regards the wearing-out, the efficiency, and the lifetime of the tire itself. This curvilinear profile is expressed by the equation:

$$y = Ax^3 + Bx^2 - Cx$$

where A, B and C are constants linked to the geometry of the lug.

5 Claims, 3 Drawing Figures

AGRICULTURAL AND INDUSTRIAL TRACTOR TIRES

DESCRIPTION

The present invention relates to pneumatic tires intended to be mounted prevalently on the driving wheels of agricultural and industrial tractors which, as is well known, must operate in the same efficacious way on any type of ground; to cite some examples, on soft, grassy surfaces as well as on hard ground, on planted fields as well as on marshy zones, and on rocky, gravelly, sandy or clayey ground.

It is well known that heavy-duty pneumatic tires of this type, in order to be able to operate well in all these different conditions, are provided with a tread having lugs which are greatly in relief, distributed circumferentially around the periphery of the pneumatic tire, spaced apart from one another, arranged in two series on opposite sides of the equatorial plane of the tire, preferably offset from one another and extending from each sidewall as far as the center line of the tire, said lugs having usually an oblique position with respect to the circumferential line of the tire.

Said lugs have prevalently a section of a shape more or less approximately like that of a trapezium, with the smaller base at a radially outer position and a plan path not exclusively rectilinear, but very often also curved or according to a broken line.

In tires having this tread, the space between two subsequent lugs is constituted by a toroidal surface or also of a more complex shape, radiused at the sidewalls of the lugs themselves; then the sidewalls can have a constant or variable inclination, equal for both the sidewalls or different from one sidewall and the other, but anyway always very steep; the carcass can be constituted by crossed plies or of the radial type; in this case, the carcass is also provided with a reinforcing annular structure arranged at the crown.

During the tire service, the lugs of the tread penetrate into the ground with the front sidewall, taking advantage of the cutting action developed by the sharp edge between the sidewall and the radially outer surface, and developing a strong tractive force, determined by the reaction between the ground and the surface of the front sidewall. Thus, it is possible to understand how the value of the developed stress depends mostly on the radial height of the lug.

The consequence of this tensile stress on the lugs of the known type having a trapezoidal section is a rapid wearing-out of the lug itself, which soon makes the tire unserviceable for work that does not consist in the simple towing action of trailers on roads in good condition; the lugs of the tires, especially when working on hard ground, wear out quickly and in a very irregular way, very often also with great damage.

In particular, the radially outer corner of the front sidewall chips away in small pieces, while thin cracking occurs at the base of the lugs which, with the passing of time, becomes more and more marked and wider and wider, up to an extent leading to the tearing of whole blocks of rubber from the lug.

Further, the strong sharp action developed by the edge of the front sidewall on the ground, even if permissible for certain work, is too strong on other grounds, as in the case in which the vehicle runs on a soft, grassy surface, and thus ruins that type of ground in a wholly unacceptable way.

In order to try to put a stop to these drawbacks, many modifications on the section and on the plan path of the lugs have been proposed in the past, among which is that of using for the front sidewall of the lugs a curvilinear profile, more precisely, a cycloid profile.

By means of this profile some advantages have been shown, especially in respect of the self-cleaning of the tire working on hard ground. However, these lugs have not solved the cited problems, which have become more serious in consequence of the great power increase provided by modern tractors and by the diffusion of work that requires greater and still greater tractive stresses as, for instance, in ploughing in depth. Said greater tensile stresses require, as seen, an increase of the height of the lugs, while as regards the behavior, the weight, and the cost of the tire, an adequate increase of the thickness of the above-said lugs is not permissible, since this latter results in lugs thinner and consequently more sensitive to fatigue, with consequent chunking, tearing and breaking, which is particularly serious when the tire works on very dry, clayey ground.

According to the present invention, a new way has been found of shaping the profile of the front sidewall of the lugs of these types of tires, which has demonstrated itself as being able to solve in large measure the stress problems, and resulting in tires able to develop a strong gripping action, protecting the lugs themselves from premature damages and irregular wearing-out, permitting instead a slower and greatly uniform wearing-out.

Therefore, the object of the present invention is a pneumatic tire for agricultural and industrial tractors provided with a tread comprising a plurality of lugs arranged one after the other around the circumference of the tire in two contiguous series, offset one with respect to the other, on opposite sides with respect to the equatorial plane of the tire, the lugs of each series extending obliquely from the tread edge toward said equatorial plane and being spaced apart from one another in a circumferential sense, each lug presenting a cross-section, perpendicular to the axis of the lug, of approximately trapezoidal shape, having two sidewalls, a front sidewall and a back sidewall, respectively, in respect of the running direction, characterized in that the front sidewall of said lugs presents in cross-section a curvilinear profile portion, convex toward the outside, radially developed toward the inside, starting from a point (K) on the radially outer surface of said lug as far as a point (P), where the curvature of said profile is null or is reversed, said profile being defined by the equation:

$$y = Ax^3 + Bx^2 - Cx \tag{1}$$

where $$A = \frac{2h}{b^3} - \frac{tgv + tgw}{b^2} \tag{2}$$

$$B = \frac{-3h}{b^2} + \frac{tgv + 2tgw}{b} \tag{3}$$

$$C = tgw \tag{4}$$

wherein, respectively, h and b are the depth with respect to the radially outer surface and the distance, parallel to said surface, of point P from the point wherein said curvilinear profile begins, v and w are the angles, referred to the direction perpendicular to the radial direction, formed by the tangents to the profile at the above-said points (P and K), and y and x are the same coordinates of a general point of said profile.

Very conveniently, the angle "w" is different from 0° and is preferably between 5° and 60°.

Also, it is convenient that the ratio between the real width of the lug corresponding to the radially outer surface and the corresponding theoretical width of said lug is between 0.4 and 0.9.

Finally, according to a further embodiment, the ratio between the depth of said point P and the depth of the lug is preferably between 0.1 and 0.6.

The present invention will be still better understood by the following description and attached drawings, made only by way of non-limiting example, of which:

Figure 1:
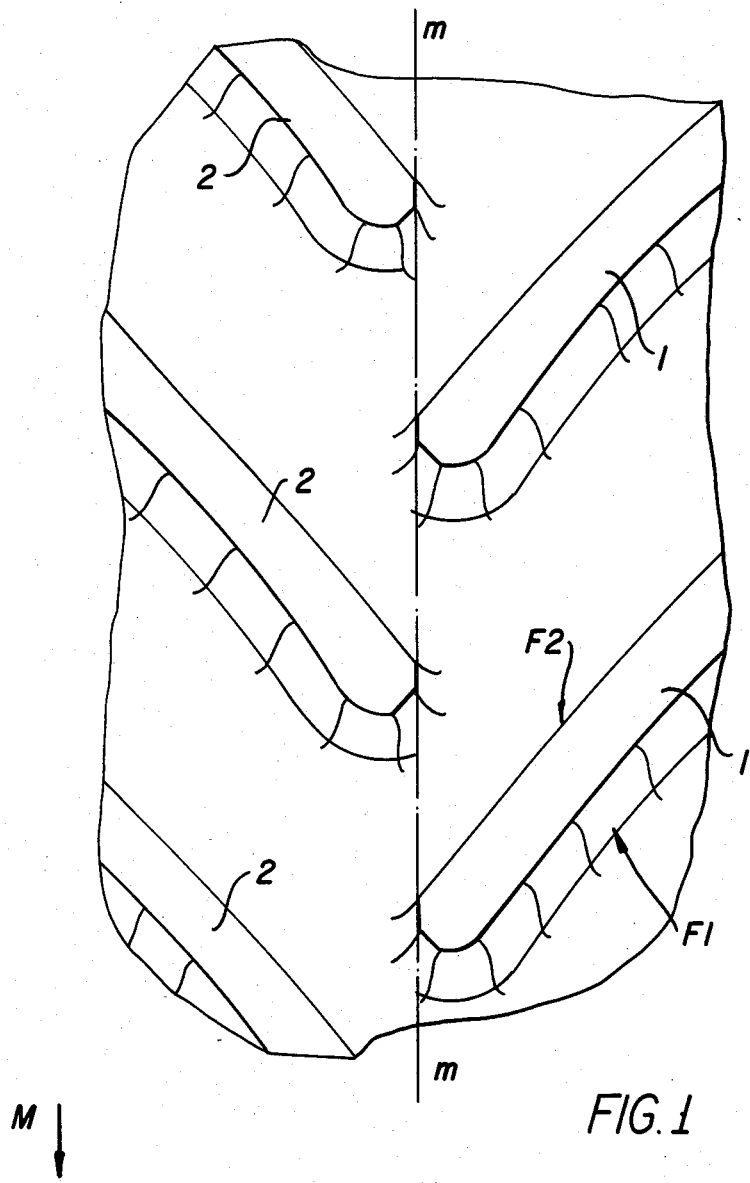
FIG. 1 shows a plan view of a tread portion according to this invention.

More specifically, FIG. 1 represents a partial plan view of the tread of a pneumatic tire for agricultural and industrial tractors according to the present invention, provided with lugs 1 and 2 of suitable height arranged circumferentially the one after the other around the periphery of the tire, in two distinct series, one for each side with respect to the equatorial plane of the tire.

As it can be seen, the lugs of the two series are offset from each other and extend obliquely with respect to the circumferential direction of the tire from the tread edges as far as the center line m—m of the tire.

The advancing direction of the tire is indicated by "M" and arrows in the figures and, with respect to this direction, said lugs show a front sidewall F1 and a back sidewall F2.

Still more precisely (FIG. 2), the lugs have a shape more or less like a trapezium (on the cross-section with a plane perpendicular to the axis of the lug), with the greater base anchored to the toroidal surface of the tire and the smaller base adapted to penetrate into the ground to originate the traction necessary for advancing the vehicle.

Figure 2:
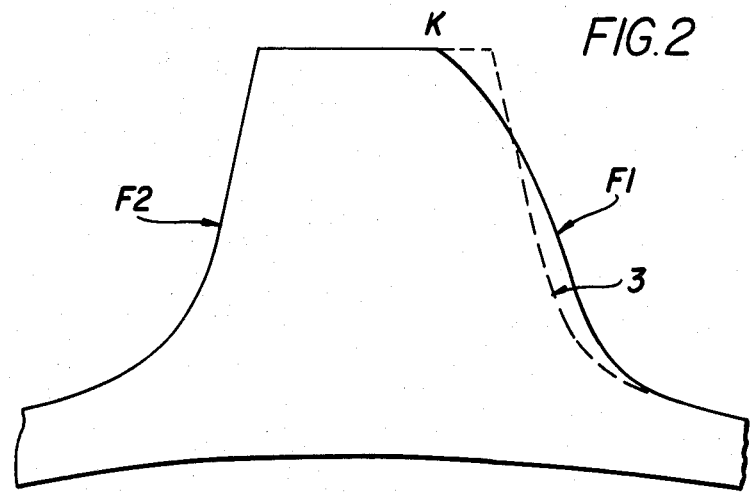
FIG. 2 shows the profile according to the invention for a lug of the tread shown in FIG. 1, on the cross-section perpendicular to the axis of the lug, in comparison with the usual profile known to the state of the art.

FIG. 2 shows with dashed line 3 the most usual known profile for said lugs, provided with two substantially rectilinear very steep sidewalls which finish with a sharp edge along the line of connection with the radially outer surface of said lug.

Figure 3:
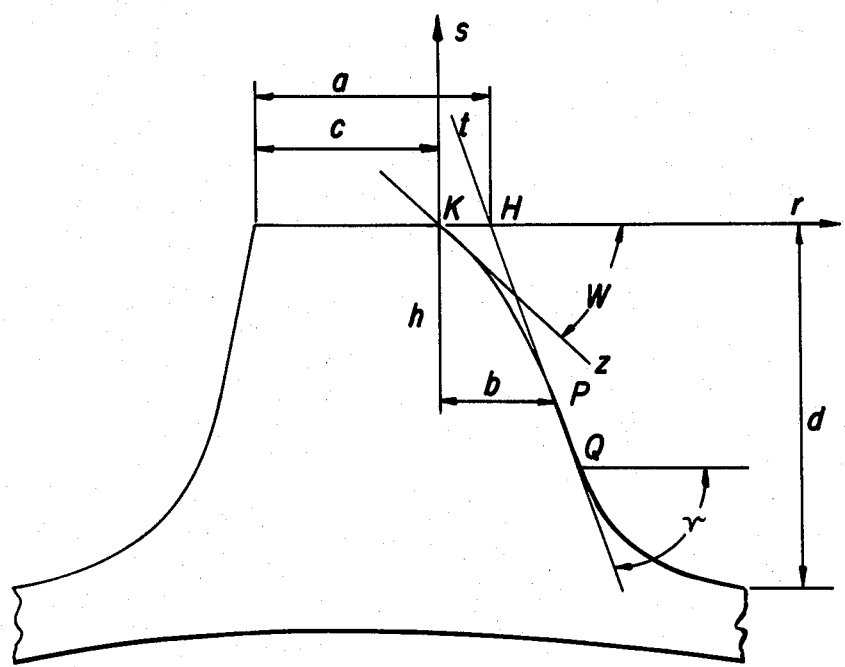
FIG. 3 shows, also on the cross-section as in FIG. 2, the parameters typical for determining the profile of the lug according to the invention.

The profile drawn with a continuous line is instead that of the lug according to the present invention; it extends between a point K on the radially outer surface of the lug and a point P (see FIG. 3) in a radially inner position on the front sidewall of said lug.

The profile according to this invention is defined through an equation whose parameters are determined as follows.

Let us start by observing that the position of K can be immediately defined. As regards point P, it must be considered that the profile according to the invention can be radiused with the groove surface, through a rectilinear portion defined by end points P and Q, which can be easily noted on the finished tire, or through a point of inflection, when P and Q coincide at only one point where the curvature of the profile is reversed; in this case, the tangent "t" is definable at the point of inflection and can be considered for the purposes of the present invention as the prolongation of the portion PQ.

The above-said tangent may or may not coincide with the profile of the lug sidewall of the known tires; in the case shown in FIG. 2, said tangent does not clearly coincide with the profile 3, having instead substantially the same inclination.

Having now defined the position P (on the cross-section in the plane perpendicular to the axis of the lug), the values h and b can be easily noted on the tire mounted on the rim and inflated at the service pressure; said values constitute, respectively, the depth of the point P with respect to the radially outer surface of the lug and its distance, in parallel to this surface, from point K.

Here it is observed that the point K constitutes the origin of a couple of cartesian axes "r" and "s", orthogonal to each other, on the plane of the cross-section, along which the planes x and y (corresponding to b and h) are to be measured; said values x and y being those relative to a general point situated along the sidewall of the lug and located between K and P so that x and y will be of opposite sign.

The curvilinear profile of the above-said sidewall is determined by the equation:

$$y = Ax^3 + Bx^2 - Cx \ Tm \quad (1)$$

where the constants A, B and C are, respectively $$A = \frac{2h}{b^3} - \frac{tgv + tgw}{b^2} \quad (2)$$

$$B = \frac{-3h}{b^2} + \frac{tgv + 2tgw}{b} \quad (3)$$

$$C = tgw \quad (4)$$

wherein "v" and "w" are the angles (FIG. 3) referred to the direction perpendicular to the radial one, formed by the tangents "t" and "z", respectively, to the profile of the lug of the invention in the points P and K.

The value of the angle v is substantially constant and equal for all tires, and is of the order of 82°−50°, while, as regards the angle w, it is advantageous that it be different from 0° and preferably between 5° and 60°.

In addition to these cited values, some other particular geometric relationships are also suitable for a particular behavior of the tire. Firstly, it can be noted in FIG. 3 that the intersection between r and t determines point H which, coupled to the radially outer corner of the lug back sidewall, permits one to establish the size of "a"; "a" being the theoretical width of the lug, i.e., the width of the radially outer surface of the known lug, corresponding to the lug according to the invention.

It is clear that the real width "c" of the lug of the invention, i.e., the distance between the said corner of the back sidewall and point K, can be easily measured directly on the tire.

It has been found that it is desirable that the value of the ratio c/a is between 0.4 and 0.9.

The depth of the lug is represented by "d", i.e., the distance between the radially outer surface and the groove surface between two adjacent lugs, measured in one plane perpendicular to the axis of the lug on the front sidewall part; also, it is preferred to choose for the ratio h/d a value between 0.1 and 0.6.

The pneumatic tire according to the present invention has demonstrated itself as able to solve rightly the difficult problem cited at the beginning of the present description.

With further reference to FIG. 2, it can be easily observed that the profile of the lug of this invention reaches a different distribution of the material alone the radial development of the lug with respect to the known profile (3), providing a lug less subjected to abrasion in radially outer position and more resistant in the radially inner position where the tearing stresses are greater. These advantages are further marked also with respect to the known cycloid profile, which, for the same mechanical resistance of the lug, requires a greater quantity of elastomeric material.

On the contrary, should this latter profile formed in such a way as to obtain a lug substantially without excess of material with respect to that of the invention, it can also be noted that the cycloid profile determines an inadmissible thinning of the lug in the proximity of its radially outer end and at the level corresponding to the zone of union with the groove surface between one lug and the adjacent one, where the cutting and tensile stresses which are exerted on the lugs are greater and where usually the tearing which leads to a premature destruction of the lugs themselves arises.

In particular, the profile according to the present invention realizes an optimal distribution of the material along the radial development of the lug, thereby eliminating all the previous chunkings of the outer front corner and stressing the regularity of the wearing-out and of the fatigue resistance.

As regards the wearing-out, this develops slowly, keeping unchanged the geometry of the lug itself, so that the anamalous vibrations of the vehicle during its running on the road and the undesired destructive effects of the grassy surface of soft ground are avoided; further, the improved fatigue resistance eliminates all those tearings at the base of the lugs which would otherwise lead to the separation of the lug from the tire with the passing of time.

Also, the pneumatic tire according to the present invention develops an efficacious and strong tractive force when the type of work and the ground require this without, however, excessively upsetting or disturbing the ground and demonstrating further a high self-cleaning capacity.

What is claimed is:

1. A pnematic tire for agricultural and industrial tractors provided with a tread comprising a plurality of lugs arranged one after the other around the circumference of the tire in two contiguous distinct series offset one with respect to the other, on opposite sides with respect to the equatorial plane of the tire, the lugs of each series extending obliquely from the tread edge toward said equatorial plane and being spaced apart from one another in a circumferential sense, each lug presenting a straight section perpendicular to the axis of the lug, of approximately trapezoidal shape, presenting two sidewalls, a front sidewall and a back sidewall, respectively, with reference to the running direction of the tire, characterized in that the front sidewall of said lugs presents, in cross-section, a curvilinear profile portion, convex toward the outside, radially developed toward the inside starting from a point (K) on the radially outer surface of said lug as far as a point (P), where the curvature of said profile is null or is reversed, said profile being defined by the equation:

$$y = Ax^3 + Bx^2 - Cx \qquad (1)$$

where $$A = \frac{2h}{b^3} - \frac{tgv + tgw}{b^2} \qquad (2)$$

$$B = \frac{-3h}{b^2} + \frac{tgv + 2tgw}{b} \qquad (3)$$

$$C = tgw \qquad (4)$$

wherein, respectively, h and b are the depth with respect to the radially outer surface and the distance, parallel to said surface of point P from the point K where the curvilinear profile begins, v and w are the angles referred to the direction perpendicular to the radial direction, respectively, formed by the tangents to the profile at points P and K, and x and y are the coordinates of a general point on said profile.

2. A pneumatic tire according to claim 1, characterized in that the angle w is different from 0° and less than 90°.

3. A pneumatic tire according to claim 2, characterized in that the angle w varies from 5° to 60°.

4. A pneumatic tire according to claim 1, characterized in that the ratio between the real width of the lug on its radially outer surface and the corresponding theoretical width of said lug is between 0.4 and 0.9.

5. A pneumatic tire according to claim 1, characterized in that the ratio between the depth of said point P and the depth of said lug is between 0.1 and 0.6.

* * * * *